Patented May 19, 1953

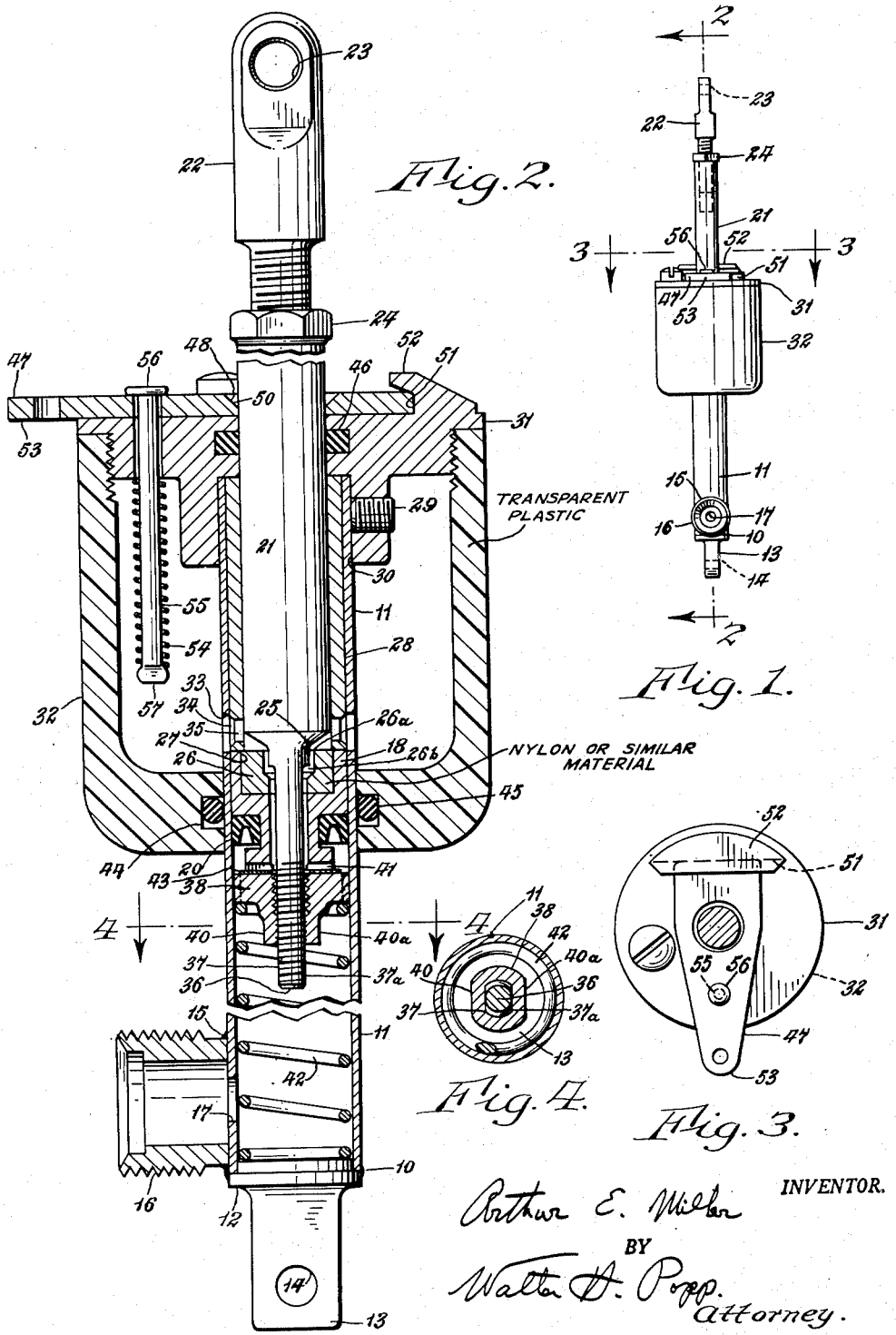

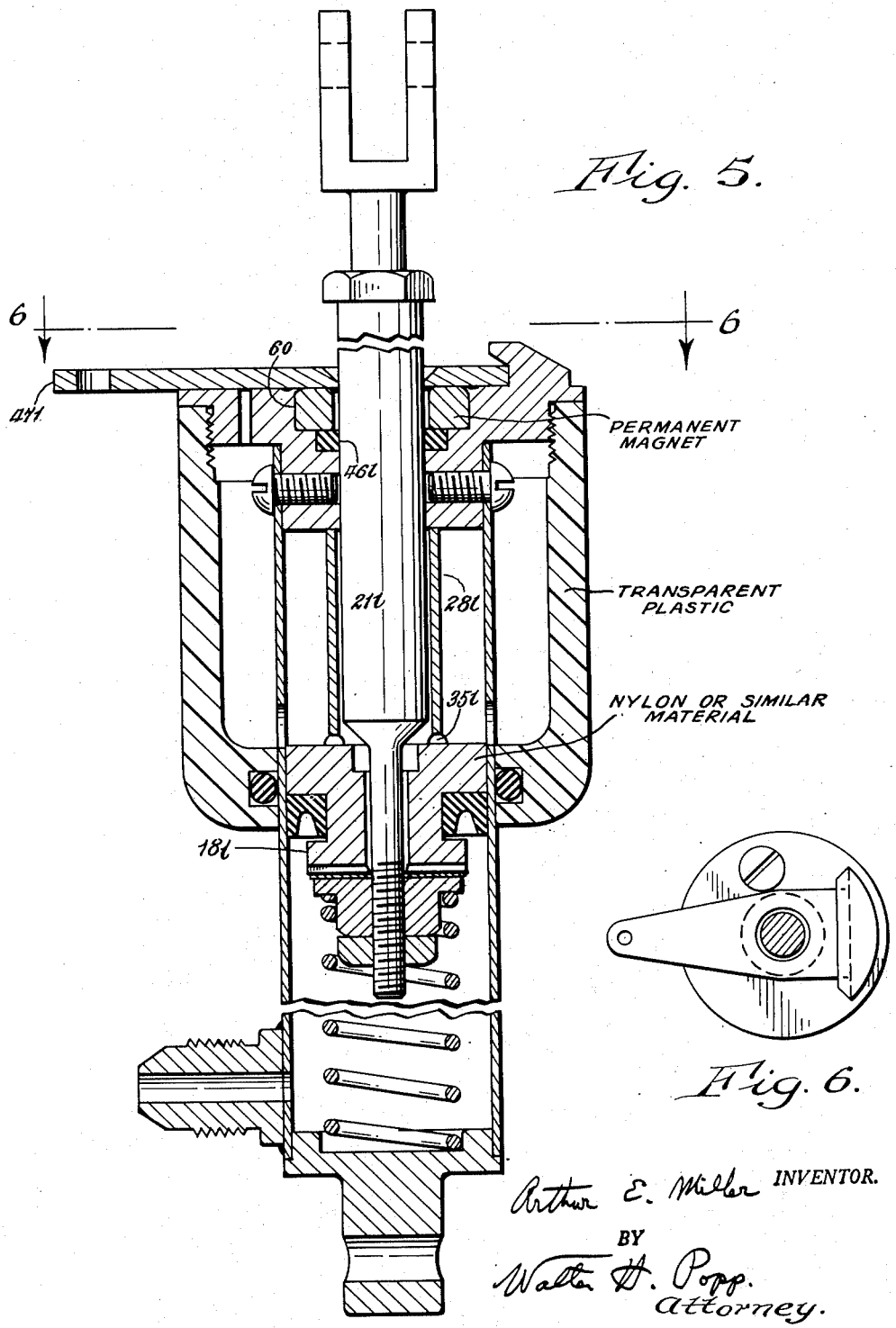

2,638,748

UNITED STATES PATENT OFFICE 2,638,748

MASTER CYLINDER WITH FLUID-VOLUME COMPENSATING VALVE IN PISTON

Arthur E. Miller, Kenmore, N. Y., assignor to The Scott Aviation Corporation, Lancaster, N. Y.

Application August 13, 1948, Serial No. 44,177

7 Claims. (Cl. 60—54.6)

This invention relates to a master cylinder, i. e., to an instrument for converting a mechanical force acting in one direction into fluid pressure, with means for returning the mechanical parts to their original position and thereby releasing the fluid pressure when said mechanical force is removed. Master cylinders are commonly used to actuate vehicle and airplane brakes, fluid clutches and work holding vises, and for other similar purposes.

The principal object of the present invention is to provide a master cylinder which will have a long life of usefulness by the elimination of the usual vent port of the cylinder which causes rapid wear in the packing of the usual piston, particularly when the brake shoe clearance is either zero (as in the "Goodyear" brake) or is close to zero as in most airplane brakes where the brake clearance is very small. A further object of the invention is to accomplish this result with a master cylinder which is light and compact and is inexpensive to manufacture. Still further objects of the invention are to provide a master cylinder in which, in very simple manner, the fluid pressure may be maintained when the brake pedal pressure is released, and in which the level of the brake fluid in the master cylinder may be easily checked visually. Other collateral objects and advantages of the invention are disclosed in detail in the following specification and appended drawings, wherein:

Fig. 1 is a diminutive side elevation of one form of my improved master cylinder.

Fig. 2 is a vertical, longitudinal section through this master cylinder, taken on line 2—2, Fig. 1.

Fig. 3 is a horizontal section, on a smaller scale than that used in Fig. 2, of this master cylinder, taken on line 3—3, Fig. 1.

Fig. 4 is a horizontal section through the lower part of this master cylinder, taken on line 4—4, Fig. 2.

Fig. 5 is a vertical, longitudinal section through a modified form of the invention.

Fig. 6 is a horizontal section thereof, on a reduced scale, taken on line 6—6, Fig. 5.

Similar characters of reference indicate like parts in the several figures of the drawings.

First sheet (Figs. 1–4)

Welded at 10 to the lower end of the cylinder 11 of the master cylinder is a plug 12 which seals the lower end of said cylinder and is provided with a lug 13 provided with a pivot hole 14 which enables the entire assembly of the master cylinder to be pivotally mounted on the chassis of an automobile or airplane or to any other desired stationary base, in the usual and well known manner.

Welded at 15 to the lower end of said cylinder is a nipple 16 which is suitably coupled or tubularly connected to the usual fluid conduits (not shown) which convey the fluid to and from the hydraulic brake or other hydraulic mechanism which is to be actuated. The cylinder is perforated at 17 to allow the fluid to pass from the interior of the cylinder 11 into and out from said nipple 16.

Slidably disposed within the cylinder 11 is a piston 18 which is provided with a V type of annular packing 20 constructed of synthetic rubber or like soft packing material. This piston is adapted to be actuated in a downward direction by a plunger 21 which is provided at its upper end with an adjustable, threaded driving head 22 provided with a pivot hole 23 which is adapted to be connected in the usual and well known manner, through suitable linkages, etc., with the brake pedal. This driving head is held in its properly adjusted position by a lock nut 24.

The lower end of the plunger 21 is tapered to form a conical valve 25 which is adapted to make fluid tight contact with a valve ring 26 having a valve seat 26a and preferably constructed of nylon or like material received within a suitable coaxially bored out recess 27 formed in the upper or rear face of the piston 18. The central upper part of said valve ring is annularly bored out to form a valve ring chamber 26b. The plunger 21 is suitably guided within the cylinder 11 by being received within the bore of a spacing bushing 28, the upper end of which, together with the upper end of the cylinder 11, is suitably received within an annular counterbore 30 formed in the lower end of a cylinder and reservoir head 31. The upper end of the cylinder 11 is detachably secured to said head 31 by a set screw 29. The spacing bushing 28 is preferably, though not necessarily, a light push fit in the upper end of the cylinder 11.

Threaded onto the head 31 is a fluid reservoir 32 which is constructed of a suitable transparent material such as the plastic "Lucite." Communication between this reservoir 32 and the bore of the spacing bushing 28 is provided by one or more holes 33 drilled radially through the cylinder 11 and providing communication with an annular groove 34 formed in the lower periphery of the spacing bushing 28 and communicating through one or more radial holes or fluid passages 35 with the bore of the spacing bushing 28.

The lowermost end of the plunger 21 is provided with a stem or shank 36 which is longitudinally flattened at 37 and 37a and is externally threaded so as to adjustably receive the nut 38, which, when it has been adjusted, is pressed in at 40 and 40a so as to engage with the flattened faces 37 and 37a of the shank 36 and prevent any further rotation of the nut 38 after the master cylinder has been adjusted and assembled. The periphery of this nut 38 is of square or hexagonal shape so as to allow fluid to freely pass upward or downward past its peripheral faces. Communication past the lower face of the piston 18 is provided by one or more radial grooves 41, and communication to or from the valve ring chamber 26a is provided by the flattened faces 37, 37a of the shank 36 of the plunger 21.

In the fully retracted position of the master cylinders shown in the drawings, the nut 38 (Figs. 1-4) is being pressed upwardly forceably by a relatively heavy compression spring 42. This, concomitantly, forceably pushes upwardly the piston 18 against the lower end of the spacing bushing 28. But the nut 38 is so adjusted that when the piston 18 has thus been brought to a halt, the plunger 21 is moved a slight distance further so as to unseat the valve seat 25 of the plunger 21 from the valve seat 26a of the valve ring. Thus, when the master cylinder is not in use, there is provided a free communication between the reservoir 32 and the nipple 16 and thereby the brake actuating mechanism which is tubularly connected with said nipple. Hence any contraction or expansion of the fluid in the brake actuating mechanism, due to ambient thermal fluctuations is compensated for, without any undue change in fluid pressure in the brake line, by permitting the fluid to move up into or out of the reservoir 32.

It has been found very desirable to ensure a prompt closing of the valve 25 just as soon as the plunger has moved downwardly a very short distance. To effect this result the increase in the fluid pressure in the region below the piston 18 has been found to be insufficient to definitely attain the desired objective, because the pressure built up at the start of the downstroke of the plunger 21 is relatively small. In the present invention an annular spring washer 43 surrounds the shank 36 and is interposed between the lower or front face of the piston 18 and the upper or rear face of the nut 38. This spring washer 43 is much weaker than the coiled compression spring 42 but is sufficiently strong to move the valve 25 of the plunger 21 towards the valve seat 26a (and hence close the valve) whenever it (the spring washer) is not being opposed by said compression spring 42. In Fig. 2 the piston 18 is shown fully retracted, and in this position the spring washer 43 is squashed flat by the compression spring 42. However, when the plunger 21 is forced downwardly from the position of Fig. 2 and against the resistance of said compression spring 42, the spring washer 43 firmly holds up the piston 18 against the bottom end of the spacing bushing 28 until the valve 25 has made a firm, fluid-tight contact with the valve seat 26a. Further downward movement of the plunger 21 causes the piston 18 to be moved bodily with it.

By this construction a very slight downward movement of the plunger from the retracted position of Fig. 2 instantly and definitely closes the valve 25, irrespective of whether or not any appreciable pressure has been built up in the lower part of the cylinder 11. This is, of course, particularly important when the plunger 21 is depressed at a relatively slow rate of speed such as occurs when the brakes are applied very gently.

As the reservoir 32 is constructed of a plastic material such as "Lucite," its fluid-tight connection with the periphery of the cylinder 11 cannot be of conventional form. In the present invention this connection is effected by thickening the lower end of the reservoir and forming therein an annular groove 44 to receive an O ring 45. This results in an inexpensive joint which is both adequately fluid-tight and readily detachable. Also, the reservoir, being constructed of transparent material, the amount of fluid contained therein may be readily ascertained visually.

To scrape off fluid from the plunger 21 as it moves upwardly to the retracted position of Fig. 2, an upper O ring 46 is arranged in the reservoir head 31.

It is sometimes desirable to lock the brakes without continuing to exert pressure on the brake pedal. This is effected by the provision of a tilt lever 47 which somewhat loosely embraces the plunger 21 in the clutch hole 48 which is bevelled at its upper corner at 50 to facilitate the locking action. The inner end of said tilt lever 47 is loosely received within a socket 51 formed by an L shaped lug 52 integrally formed at the upper face of the reservoir head 31. The action is as follows: The operator first depresses the plunger 21 as far as he desires. He then manually lifts the outer end 53 of the tilt lever 47 until the plunger 21 is cramped. He is then free to release his pressure on the plunger 21 without allowing the brakes to be released. When he desires to release the brakes, he first depresses the plunger 21 until the tilt lever 47 is uncramped from said plunger under the influence of compression spring 54 which resiliently urges the outer end 53 of the tilt lever downwardly through the intermediary of a retracting rod 55 provided with a head 56 at its upper end and a squashed out portion 57 at its lower end. When the plunger 21 has thus been uncramped, the operator merely releases his pressure on the plunger 21 and the tilt lever 47, under the influence of its spring 54, remains inoperative until the operator desires to again "lock" the brakes by lifting the outer end 53 of said tilt lever.

Second sheet (Figs. 5 and 6)

The construction of master cylinder shown in these figures is fundamentally similar to that in Figs. 1-4, with the following exceptions:

1. The entire piston 18L is constructed of nylon or similar material.
2. The tilt lever 47L is urged towards its retracted position by an annular magnet 60 which also serves to hold the upper O ring 46L in place.
3. The sleeve 28L is not employed to guide the plunger 21L but is used solely to limit upward movement of the piston 18L and its lower end instead of being drilled to furnish fluid passages, is pressed out at one or more places to form semi-circular fluid passages 35L.

I claim:

1. A master cylinder comprising: a cylinder; a piston having a valve seat; a plunger having a portion adapted to engage said valve seat when said plunger is advanced and also having a forwardly extending threaded shank flattened on one face; and a nut arranged on said shank forwardly of the piston, and adapted to be compressed so as to engage said flattened face of said shank after said nut has been adjusted to allow the desired forward movement of the piston relatively to the plunger.

2. A master cylinder comprising: a head having a counterbore; a cylinder having its rear end received within said counterbore and secured to said head; a reservoir; a spacing bushing arranged within said rear end of said cylinder and provided with a bleed hole communicating with said reservoir; a plunger slidably disposed within the bore of said spacing bushing; and a piston slidably arranged at the front end of said plunger and disposed within the bore of the cylinder.

3. A master cylinder comprising: a head having a counterbore; a cylinder having its rear end received within said counterbore and secured to said head; a reservoir; a spacing bushing arranged within said rear end of said cylinder and provided with a peripheral bleed channel communicating with said reservoir and also provided with a bleed hole opening into said bleed channel; a plunger slidably arranged within the bore of said spacing bushing; and a piston slidably arranged at the front end of said plunger and disposed within the bore of the cylinder.

4. A master cylinder comprising: a head; a reservoir; a cylinder connected at its rear end with said head and having a transfer aperture communicating with said reservoir; a spacing bushing arranged within said rear end of said cylinder and provided with a bleed hole communicating with said transfer aperture; a plunger slidably arranged within the bore of said spacing bushing; and a piston slidably arranged at the front end of said plunger in front of said spacing bushing and within the bore of the cylinder.

5. A master cylinder comprising: a head; a reservoir; a cylinder connected at its rear end with said head and having a transfer aperture communicating with said reservoir; a spacing bushing arranged within said rear end of said cylinder and provided with a peripheral fluid channel and a fluid passage both communicating with said transfer aperture; a plunger slidably arranged within the bore of said spacing bushing; and a piston slidably arranged at the front end of said plunger and disposed within the bore of the cylinder.

6. A master cylinder comprising: a head; a reservoir; a cylinder connected with said head; a spacing bushing in said cylinder; a plunger in said bushing and having a forwardly extending shank; a piston on said shank and in said cylinder; and means for limiting the forward movement of said piston relatively to the plunger.

7. A master cylinder comprising: a head; a reservoir; a cylinder connected with said head; a spacing bushing in said cylinder; a plunger in said bushing and having a forwardly extending threaded shank; a piston on said shank and in said cylinder; and having a radial groove on its front face; and a nut on said threaded shank and arranged forwardly of said piston.

ARTHUR E. MILLER.

References Cited in the file of this patent

UNITED STATES PATENTS

| Number | Name | Date |
|---|---|---|
| 1,997,100 | Boughton | Apr. 9, 1935 |
| 2,004,078 | McDougall | June 4, 1935 |
| 2,020,465 | Hall | Nov. 12, 1935 |
| 2,041,065 | Hemphill | May 19, 1936 |
| 2,060,846 | Bowen | Nov. 17, 1936 |
| 2,120,073 | Majneri | June 7, 1938 |
| 2,152,345 | Bowen | Mar. 28, 1939 |
| 2,152,499 | Rasmussen | Mar. 28, 1939 |
| 2,219,336 | Sauzedde | Oct. 29, 1940 |
| 2,242,096 | Thomas | May 13, 1941 |
| 2,248,426 | Fowler | July 8, 1941 |
| 2,310,976 | Masteller | Feb. 16, 1943 |
| 2,326,116 | Baldwin | Aug. 10, 1943 |
| 2,447,142 | Smith et al. | Aug. 17, 1948 |
| 2,541,312 | Vogel | Feb. 13, 1951 |